United States Patent
Moore et al.

(10) Patent No.: US 7,543,042 B2
(45) Date of Patent: Jun. 2, 2009

(54) REMOTE ACCESS METHOD FOR ACCESSING DYNACACHE DATA

(75) Inventors: Victor S. Moore, Boynton Beach, FL (US); Wendi L. Nusbickel, Boca Raton, FL (US); Ricardo Dos Santos, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/833,621

(22) Filed: Apr. 28, 2004

(65) Prior Publication Data

US 2005/0257007 A1 Nov. 17, 2005

(51) Int. Cl.
*G06F 15/16* (2006.01)
(52) U.S. Cl. .......... 709/219; 709/203; 709/216; 709/217; 711/118; 711/119; 711/129; 711/130; 719/328; 719/329; 715/744; 715/748; 707/200; 707/201
(58) Field of Classification Search .......... None
See application file for complete search history.

(56) References Cited

U.S. PATENT DOCUMENTS

| | | | |
|---|---|---|---|
| 6,222,838 B1 | 4/2001 | Sparks et al. | |
| 6,292,880 B1 * | 9/2001 | Mattis et al. | 711/216 |
| 6,430,174 B1 | 8/2002 | Jennings et al. | |
| 6,490,564 B1 | 12/2002 | Dodrill et al. | |
| 6,507,854 B1 | 1/2003 | Dunsmoir et al. | |
| 6,553,427 B1 | 4/2003 | Chang et al. | |
| 6,567,809 B2 | 5/2003 | Santosuosso | |
| 6,598,067 B1 * | 7/2003 | Wydra et al. | 718/100 |
| 6,601,142 B2 | 7/2003 | Cox et al. | |
| 2003/0074393 A1 * | 4/2003 | Peart | 709/203 |

\* cited by examiner

*Primary Examiner*—Hyung S Sough
*Assistant Examiner*—Kaushikkumar Patel
(74) *Attorney, Agent, or Firm*—Novak Druce + Quigg

(57) ABSTRACT

A method for accessing an internal dynamic cache of a Websphere-type Application Server (WAS) from an external component that includes the step of establishing a software interface component within the WAS. The software interface component can receive a request from the external component. The request can include an identifier for a cache object and at least one dictate concerning the cache object. The external cache component can lack privileges to directly execute programmatic actions upon the cache object. The software interface component can trigger a programmatic action in accordance with the dictate. The programmatic action can involve the cache object, wherein the programmatic action utilizes the internal dynamic cache and involves the cache object. The programmatic action can be an action performed local to the WAS.

7 Claims, 2 Drawing Sheets

```
public class DynaCacheServlet extends HTTPServlet{

/**
* the method doGet performs the HTTP GET operation.  This Triggers
* the use of the WAS Distributed MAP API to Dynacache.
* @param req Encapsulates the request to the servlet
* @parm resp Encapsulates the request fr/the servlet
*
* <p> A caller invokes a servlet with a serves of parameters.
* For example, a get request for an object could look like the following:
* <code> "http://myserver.server1.ibm.com/wvs/dynacache?cmd=get&key=123</code>
*
* <p> The request parameters for this servlet follow:
* <pre>
* key - Required with all cmds. Used to uniquley identify item in cache
* cmd - The command to execute, 'get' or 'put' or 'invalidate'
*     = "get" -Get info from the cache.
*     -- other parameters required with this command:
*     --- "policy"    - Replication policy (optional)
*     = "put"         - Put info into the cache
*     -- other parameters required (unless noted otherwise) with this command:
*     --- "value"     - Actual data if can be represented by a string.
*     --- " ttl"      - Time to Live
*     --- "policy"    - Replication policy
*     --- "depids"    - List of dependent items in cache
*     -- " invalidate" - Put info into the cache
*     -- "wait"       - Indicates if removal is immediate (optional)
* </pre>
* @ return  None
* @ exception IOException       Thrown when an I/O error is encountered
* @ exception ServletException  Thrown when a supporting servlet method fails
* @ see java.servlet.http.HttpServlet#void (javax.servlet.http.HttpServletRequest,
javax.servlet.http.HttpServletResponse)
*/
public void doGet(HttpServlet Request req, HttpServletResponse resp)
     throws ServletException, IOException{
        }
```

FIG. 3

REMOTE ACCESS METHOD FOR ACCESSING DYNACACHE DATA

BACKGROUND

1. Field of the Invention

The present invention relates to the field of dynamic caching and, more particularly, to exposing internal dynamic caching services of a Web-based application server to remote components.

2. Description of the Related Art

Caching is a technique of temporarily storing frequently accessed data in random access memory (RAM) or in a special area of a hard disk drive, to reduce the time required to read and write data. Server-side caching techniques are often used to improve performance of Web applications. Conventional solutions for caching static content have resulted in excellent performance gains for many Web applications. Unfortunately, these caching solutions are of little to no value in enhancing the performance of Web applications with dynamically generated content. For dynamic content caching to be effective, dynamic content or data, which is by definition subject to change, must be stable over a long enough time for meaningful reuse to occur. If access is frequent, even a short period of stability can provide a significant enough performance increase to warrant data caching.

International Business Machine (IBM), Corporation of Armonk, NY has developed and refined technologies that enable the caching of dynamic content. The technology has been included in a dynamic content caching solution for Java based (J2EE) applications, such as applications built using Sun Microsystems' JAVA 2 ENTERPRISE EDITION (™) application programming interface, running on Web-based application server configured as an IBM WEBSPHERE APPLICATION SERVER (™) version 5.0 and higher (WebSphere-type Application Server), where the built in dynamic caching server can be referred to as a dynacache, where a WebSphere-type Application server (WAS) can include any servers derived from or based upon the IBM WEB SPHERE APPLICATION SERVER (™) architecture (WebSphere cluster). The dynacache operates within a WAS Java Virtual Machine (JVM) to provide generalized Java object caching for use by various internal components. The dynacache can cache objects directly in WAS memory spaces with the ability to "overflow" objects to disk to avoid over-utilizing RAM. The dynacache memory can be distributed across multiple servers and managed as a single logical memory space. The dynacache can be optionally replicated across a cluster to avoid expensive regeneration on each server when multiple servers are used. As a service, the dynacache can be configured, tuned, and monitored through system management interfaces of the WAS.

In a simplified form, the dynacache can be conceptualized as a robust Hashtable capable of storing and retrieving Java objects from memory. The dynacache can manage entries by controlling growth using replacement and/or eviction algorithms. Entries within the cache can be managed by a policy based on the class of entry, such as servlet, Java Server Page (JSP), Enterprise Java Bean (EJB), command, and the like. The policy can be expressed in an electronic document, such as an Extensible Markup Language (XML) file (cachespec.xml).

The dynacache uses a facility called the Data Replication Service (DRS), which is a Java Messaging Service (JMS) based facility, to replicate cached data and propagate invalidate events within a WebSphere cluster. Invalidate events are events that remove an object from a cache and/or mark an object within the cache for removal. Additionally, to support caching performed outside of the J2EE application space, the dynacache can cooperate with a plurality of caches within the WAS through one or more cache adapters to actively trigger invalidations of cached Web content to registered adapters. Registered adaptors include a HTTP (Hypertext Transfer Protocol) plugin such as the IBM WEBSPHERE HTTP PLUGIN (™), an HTTP server such as the IBM HTTP SERVER (™) Fast Response Cache Accelerator (FRCA) cache, and a proxy server such as the IBM WEBSPHERE EDGE SERVER (™). Accordingly, some level of data sharing and synchronization can be performed between the dynacache and other caches and/or application servers.

There is currently no way, however, for components that do not run inside the WAS to directly access objects within the dynacache and data embedded within these objects. Objects within the dynacache are typically Java objects that include internal data and private methods for accessing the internal data.

By way of example, the dynacache can contain compiled speech grammars and a Java Grammar Compiler running inside an EJB can place grammars in the dynacache. An external software component can receive compiled grammar files from the WAS, where the files are generated from information within the dynacache. Even so, the external software component cannot directly access objects within the dynacache to obtain and/or manipulate the speech grammar information contained within the dynacache. This is true regardless of whether the external software component is a J2EE component external to the WAS or a component written in a non-Java language, such as a component written in the "C" programming language.

SUMMARY OF THE INVENTION

The present invention creates an interface to a dynamic cache that is internal to an application server. The interface can expose dynamic cache services to components external to the application server. For example, in one embodiment, the solution provided herein describes an interface to the dynacache of a Web-based application server (WAS) configured as an IBM WEB SPHERE APPLICATION SERVER (™) (WebSphere-type Application Server) that can be used by components outside the WebSphere-type Application Server (WAS).

More specifically, the solution can create an externally accessible interface to expose the dynacache's DistributedMap Application Program Interface (API), which is normally a local interface. In a particular embodiment, a Java HTTP servlet can expose the DistributedMap API to permit components written in any programming language to access the dynacache via an HTTP interface. In another embodiment, a stateless session EJB can extend and expose the dynacache API providing dynacache access to components of Java based (J2EE) applications, such as applications built using Sun Microsystems' JAVA 2 ENTERPRISE EDITION (™) application programming interface, that are external to the WAS.

One aspect of the present invention can include a method for accessing an internal dynamic cache of a WAS from an external component. The method can include the step of establishing a software interface component within the WAS. The software interface component can receive a request from the external component. The request can include an identifier for a cache object and at least one dictate concerning the cache object. The external cache component can lack privileges to directly execute programmatic actions upon the cache object. The software interface component can trigger a programmatic action in accordance with the dictate. The programmatic action can involve the cache object, wherein the programmatic action utilizes the internal dynamic cache and involves the cache object. The programmatic action can be an action performed local to the WAS.

Another aspect of the present invention can include a dynamic caching system that includes a Web-based application server, a remote component, and a software interface object. The Web-based application server can include a dynamic cache into which software objects are placed. The dynamic cache can be a single logical memory space that includes a multitude of physical memory spaces distributed across multiple computing devices. For example, the Web-based application server can be a WAS and the dynamic cache can be a dynacache. The remote component can be a software component external to the Web-based application server that lacks privileges to directly perform actions upon objects within the dynamic cache. The software interface object can be internal to the Web-based application server. The software interface object can receive a request from the remote component and can responsively trigger a programmatic action against an identified software object in the dynamic cache in accordance with the request.

Moreover, this invention can be implemented as a program for controlling a computer to implement the functions described above, or a program for enabling a computer to perform the process corresponding to each step of the method presented above. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments that are presently preferred; it being understood, however, that the invention is not limited to the precise arrangements and instrumentalities shown.

FIG. 3 is expository pseudo-code for a software interface object in accordance with the inventive arrangements disclosed herein.

DETAILED DESCRIPTION OF THE INVENTION

The subject matter presented herein discloses a software interface object that can permit software components external to a Web-based application server to access a dynamic cache of the Web-based application server even though access to the dynamic cache is typically limited to internal components. In one embodiment, the Web-based application server can be a Web-based application server (WAS) configured as an IBM WEBSPHERE APPLICATION SERVER (™) (WebSphere-type Application Server) and the dynamic cache can be a dynacache of the WebSphere-type Application Server (WAS).

Figure 1:
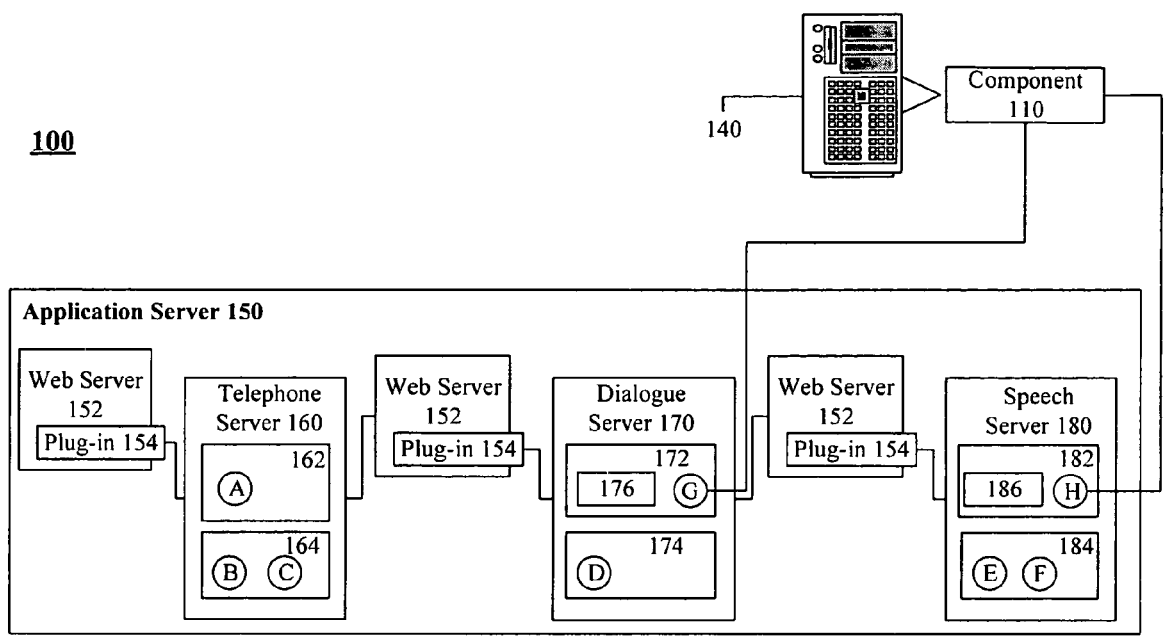
FIG. 1 is a schematic diagram illustrating a system that includes a software interface object exposing a dynamic cache of a Web-based application server in accordance with the inventive arrangements disclosed herein.

FIG. 1 is a schematic diagram illustrating a system 100 that illustrates the placement of a software interface object relative to a Web-based application server and a remotely located software component in accordance with the inventive arrangements disclosed herein. The system 100 can include an application server 150 communicatively linked to a remote server 140 through an external component 110 that is linked to software interface object G and/or software interface object H. Software interface objects G and H can expose at least one dynamic cache service to the external component 110. It should be appreciated that the dynamic cache can be distributed across multiple locations within the application server 150. Accordingly, the dynamic cache can include local cache 176, local cache 186, as well as other localized caches disposed throughout the application sever 150. Particular ones of these local caches can be associated with software interface objects to expose either the local cache objects and/or the dynamic cache to the external component 110. For example, cache 176 can be associated with software interface object G and cache 186 can be associated with software interface object H.

It should be noted that the software interface objects G and/or H can be disposed within virtual machines included in the application server 150, such as dialogue server 170 and/or speech server 180. The invention is not limited in this regard, however, and the software interface objects G and H can be placed anywhere within the application server 150 that permits access to the internal dynamic cache of the application server 150.

The application server 150 can function as a transaction engine that operates as a reliable foundation for handling high volume secure transactions and Web services. In one embodiment, the application server 150 can be a Websphere Application Server (WAS).

In one arrangement, the application server 150 can include a multitude of component servers, such as telephone server 160, dialogue server 170, and speech server 180, communicatively linked via a multitude of Web servers 152. Each Web server 152 can include one or more plug-ins 154, where each plug-in 154 can include routines for conveying data to particular component servers within the application server 150. In a particular arrangement, component servers of the application server 150 can also be distributed across a network. In such an arrangement, data can be conveyed to each of the component servers via the Web servers 152. The Web servers 152 can utilize Hypertext Protocol Format (HTTP) for compatibility with IP sprayers and firewalls.

The telephone server 160, the dialogue server 170, and the speech server 180 can be implemented as virtual machines, such as virtual machines complying with the J2EE specification. The telephone server 160 can control the setup, monitoring, and tear down of phone calls. In one arrangement, telephone server 160 can include a web container 160 and an EJB container 164. Moreover, the telephone server 160 can include a call control servlet (servlet A), a call control EJB (Bean B), and a call control interpreter EJB (Bean C).

The dialogue server 170 can manage tasks relating to call dialogue for the application server 150. In one arrangement, the dialogue server 170 can include web container 172 and EJB container 174. Moreover, the dialogue server 170 can include a voice markup interpreter EJB (Bean D).

The speech server 180 can handle one or more speech services for the application server 150. In one arrangement, the speech server 180 can include web container 182 and EJB container 184. Moreover, the speech server 180 can include automatic speech recognition (ASR) EJB (Bean E) as well as a text-to-speech EJB (Bean F). It should be appreciated that the application server 150 can be arranged in a multitude of fashions and that the invention is not to be limited to the illustrative arrangement presented herein.

Figure 2:
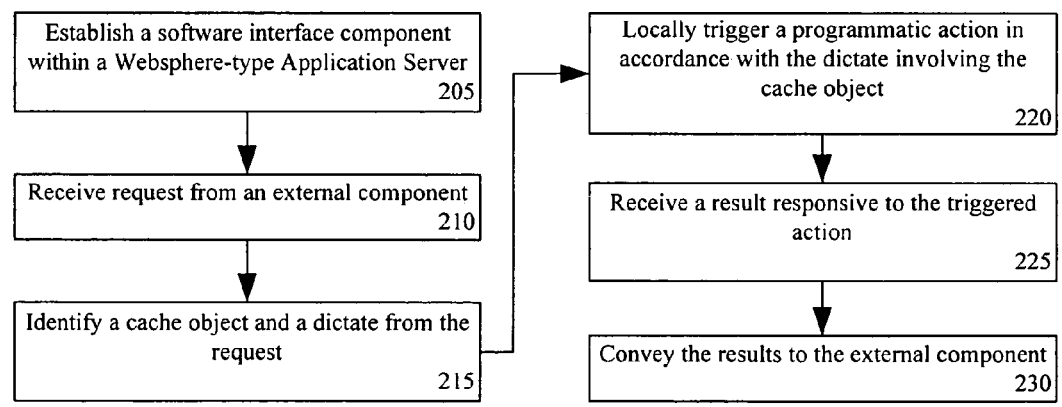
FIG. 2 is a flow chart illustrating a method for accessing a dynamic cache internal to a Web-based application sever from an external component in accordance with the inventive arrangements disclosed herein.

FIG. 2 is a flow chart illustrating a method 200 for accessing a dynamic cache internal to a Web-based application server from an external component in accordance with the inventive arrangements disclosed herein. The Web-based application server can be a WAS and the dynamic cache can be a dynacache of the WAS. The method can begin in step 205, where a software interface component can be established within a WAS. In step 210, a request from a component external to the WAS can be received by the software interface component. For example, the request can be conveyed via HTTP through a Web-based communication link between the server upon which the external component is located and the WAS server in which the software interface component is disposed. In step 215, the software interface component can identify an object within the dynacache and a dictate from information contained within the request.

In step 220, the software interface object can locally trigger a programmatic action in accordance with the dictate. Programmatic actions include actions that get or retrieve data from a cache object, put data into a cache object, and/or remove cache objects from the dynacache. Data inserted into the cache objects can be specified by parameters contained within the request. Further, options can be associated with the programmatic actions that can be detailed within the request. For example, an invalidation action, that removes a cache object from the data cache, can specify whether removal is to occur immediately or responsive to a the occurrence of a defined event.

In one embodiment, the software interface object can access a method of an application program interface (API) associated with the dynacache, such as a Distributed Map API. In such an embodiment, the API method can perform the programmatic action responsive to a trigger from the software interface component.

In step 225, a result can be received responsive to the triggered action. Not all programmatic actions need return results. In step 230, the results can be incorporated into a response parameter and conveyed to the external component.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

FIG. 3 is expository pseudo-code for a software interface object in accordance with the inventive arrangements disclosed herein. The software interface object can accept dictates for performing actions involving the dynamic cache from an external component. Objects within the dynamic cache upon which actions can be performed can include components of Java based (J2EE) applications, such as applications built using Sun Microsystems' JAVA 2 ENTERPRISE EDITION (™) application programming interface. Actions performed against these J2EE components can include get data actions, put data actions, and invalidate object actions, where an invalidate object action can remove an identified J2EE component from the dynamic cache. The software interface object, being internal to the application server, is able to expose internal capabilities of the dynamic cache to the external component. In one embodiment, the software interface object can utilize an application program interface (API) of the dynamic cache. For example, when the application server is the WAS, the API can be the DistributedMap API.

In one embodiment, the software interface object can be implemented as a public stateless session Enterprise Java Bean (EJB) executing within a virtual machine of the application server. It should be noted that such an implementation can expose dynamic cache services to external Java components.

A more generic implementation of the software interface object can place a servlet within the Web-based application server. The servlet can accept requests from external components and can return responsive parameters using a Hypertext Transfer Protocol (HTTP). An HTTP servlet implementation can expose dynamic cache services to external components written in any programming language.

It should be appreciated that the presented coding example in FIG. 3 provides just one illustrative method of implementing a software interface object and that the invention is not to be limited in this regard. For example, an otherwise private Java class with access to dynamic cache objects can be extended by a public class, where instantiations of this public class can be a software interface object as defined herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing an application operating in an external component access to an internal dynamic cache of an application server (AS), the method comprising the steps of:

establishing one or more software interface components within the AS, wherein the AS comprises a plurality of component servers communicatively linked through a plurality of Web servers within the AS, wherein each software interface component is associated with a particular component server, wherein the internal dynamic cache of the AS comprises a plurality of local caches, each local cache associated with a particular one of the component servers, and wherein each corresponding software interface object is configured to expose at least a portion of the internal dynamic cache to the external application, said portion comprising at least the corresponding local cache;

said software interface component receiving a request from said external application, said request comprising an identifier for a cache object of at least one of the component servers and at least one dictate concerning said cache object, wherein said external application lacks privileges to directly execute programmatic actions upon said cache object, and wherein said cache object comprises a dynamic cache object being stored in said internal dynamic cache when the request is received; and said software interface triggering a programmatic action upon said cache object in accordance with said dictate from said external application, wherein said software interface is programmatically connected to an application program interface (API) of the internal dynamic cache, said API accepting commands from components internal to said AS and not accepting commands from applications operating in components external to said AS, said triggering step further comprising the step of triggering a procedure of the API, and said procedure of said application program interface performing said programmatic action, wherein said programmatic action is an action performed local to said AS.

2. The method of claim 1, further comprising the steps of:

said software interface component receiving a result responsive to said triggered action; and said software interface component conveying said result to said external application.

3. The method of claim 2, wherein said programmatic action is a get data action, said triggering step further comprising the step of getting information about said cache object disposed within said internal dynamic cache.

4. The method of claim 1, wherein said programmatic action is a put data action, said triggering step further comprising the step of putting information contained within said request into said cache object disposed within said internal dynamic cache.

5. The method of claim 1, wherein said programmatic action is an invalidate action, said triggering step further comprising the step of removing said cache object from said internal dynamic cache.

6. The method of claim 1, wherein said software interface object comprises at least one of a java serviet and an enterprise java bean.

7. The method of claim 1, wherein said AS comprises an AS-based voice server, wherein said voice server comprises a telephone server, a dialogue server, and a speech server implemented as virtual machines.

* * * * *